(12) United States Patent
Gilbert et al.

(10) Patent No.: US 10,853,152 B2
(45) Date of Patent: Dec. 1, 2020

(54) TOUCH APPLICATION PROGRAMMING INTERFACES

(71) Applicant: Microsoft Technology Licensing, LLC, Redmond, WA (US)

(72) Inventors: Brent Gilbert, Woodinville, WA (US); Benjamin D. Haynes, Newcastle, WA (US); Tony J. Beeman, Seattle, WA (US); Tyler R. Adams, Seattle, WA (US)

(73) Assignee: Microsoft Technology Licensing, LLC, Redmond, CA (US)

( * ) Notice: Subject to any disclaimer, the term of this patent is extended or adjusted under 35 U.S.C. 154(b) by 0 days.

(21) Appl. No.: 16/181,159

(22) Filed: Nov. 5, 2018

(65) Prior Publication Data

US 2019/0073248 A1    Mar. 7, 2019

Related U.S. Application Data

(63) Continuation of application No. 14/928,153, filed on Oct. 30, 2015, now Pat. No. 10,120,735.

(60) Provisional application No. 62/139,895, filed on Mar. 30, 2015.

(51) Int. Cl.
| | |
|---|---|
| *G06F 9/54* | (2006.01) |
| *G06F 3/0488* | (2013.01) |
| *G06F 9/451* | (2018.01) |
| *G06F 3/038* | (2013.01) |
| *G06F 3/01* | (2006.01) |
| *G06F 3/041* | (2006.01) |

(52) U.S. Cl.
CPC ............... *G06F 9/543* (2013.01); *G06F 3/01* (2013.01); *G06F 3/038* (2013.01); *G06F 3/041* (2013.01); *G06F 3/0488* (2013.01); *G06F 9/451* (2018.02); *G06F 2203/04808* (2013.01)

(58) Field of Classification Search
None
See application file for complete search history.

(56) References Cited

U.S. PATENT DOCUMENTS

| | | | | |
|---|---|---|---|---|
| 9,046,917 | B2* | 6/2015 | Senanayake | G06F 3/01 |
| 9,600,103 | B1* | 3/2017 | Eischeid | G06F 3/04817 |
| 9,946,307 | B2* | 4/2018 | Lutz, III | G06F 1/1637 |
| 10,120,735 | B2* | 11/2018 | Gilbert | G06F 3/01 |
| 2005/0193367 | A1* | 9/2005 | Allen | G06F 17/5009 717/105 |

(Continued)

*Primary Examiner* — Umut Onat

(57) ABSTRACT

Systems, methods, apparatuses, and software for touch input systems in computing environments are provided herein. In one example, an interaction service positioned logically between an operating system and an application is provided. The interaction service directs a processing system to receive a call from the application referencing an interaction class to attach to an object in a user interface used for the application, wherein the interaction class comprises a set of declarative statements. The interaction class attaches to the object in the user interface. A user input is then identified to the operating system associated with the object. In response to the user input, the interaction service determines which one of the declarative statements corresponds to the user input. The one of the declarative statements is then executed to call corresponding native code that performs an action with respect to the object.

20 Claims, 5 Drawing Sheets

(56) References Cited

U.S. PATENT DOCUMENTS

2009/0300658 A1* 12/2009 Morris .................... G06F 21/10
719/321
2010/0103117 A1* 4/2010 Townsend ............. G06F 3/0488
345/173
2014/0132551 A1* 5/2014 Bathiche ................ G06F 3/041
345/174

* cited by examiner

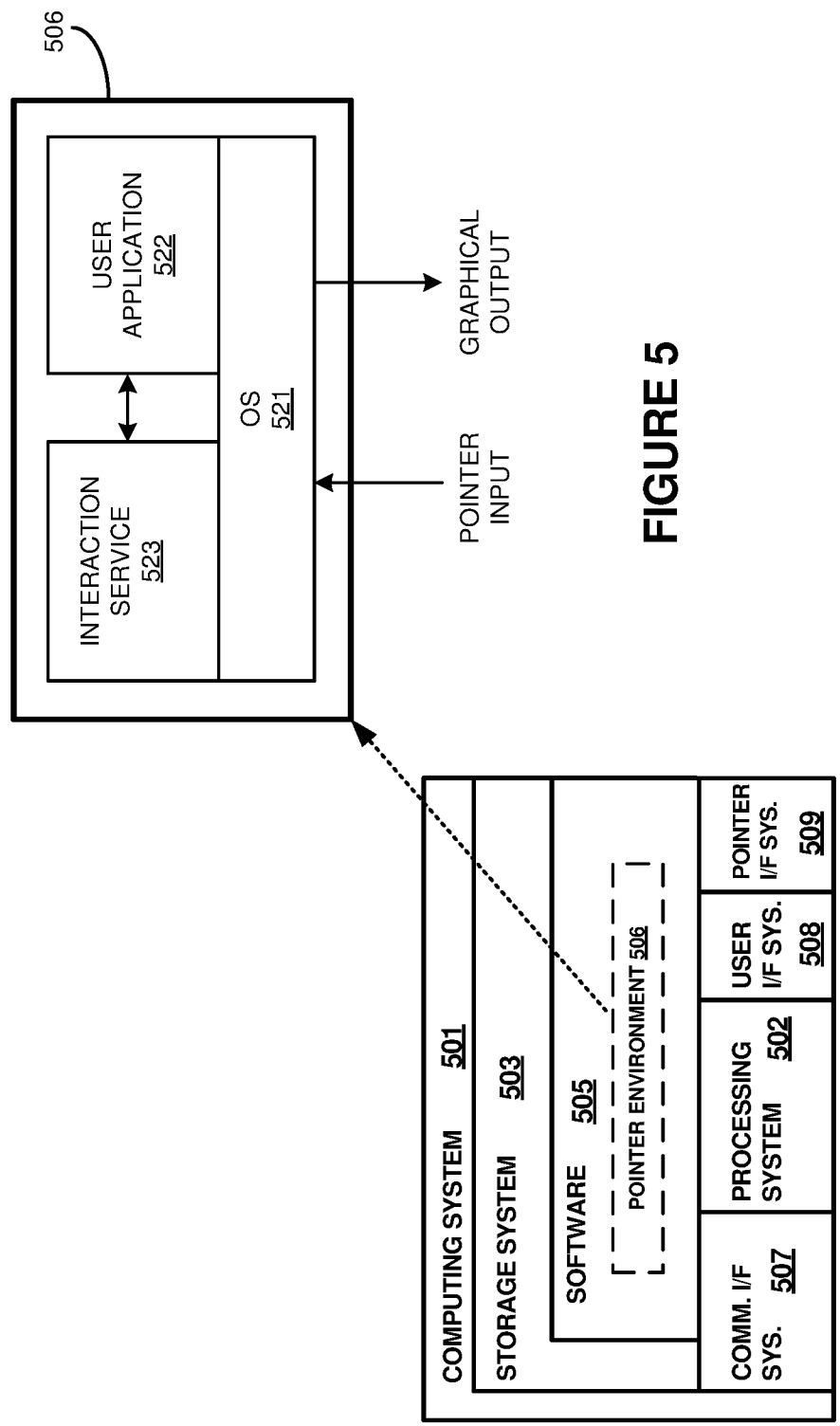

TOUCH APPLICATION PROGRAMMING INTERFACES

RELATED APPLICATIONS

This application is a continuation of and claims priority to issued U.S. Pat. No. 10,120,735, granted on Nov. 6, 2018, and entitled "TOUCH APPLICATION PROGRAMMING INTERFACES," which is hereby incorporated by reference in its entirety. Issued U.S. Pat. No. 10,120,735 is related to and claims priority to U.S. Provisional Patent Application No. 62/139,895, filed Mar. 30, 2015, and entitled "TOUCH APPLICATION PROGRAMMING INTERFACES," which is hereby incorporated by reference in its entirety.

TECHNICAL FIELD

Aspects of the disclosure are related to the field of computing systems and user input systems in computing environments.

TECHNICAL BACKGROUND

Touch computing devices, such as tablets, smartphones, and the like, allow a user to interact with the devices using a finger or stylus, in addition to more traditional devices that use a mouse or keyboard for user interaction. Typically, these devices allow a user to run any number of user applications to perform various computing and productivity tasks, including word processing, gaming, web browsing, email, spreadsheets, programming, multimedia viewing, and other various tasks. An operating system is employed on these devices to both provide a software platform for the applications and to allow interaction with the underlying hardware, such as a mouse/keyboard, touch screens, displays, speakers, microphones, and any number of network connections.

However, in many examples, user input received through a user interface causes a cascading sequence of events to allow the device to respond to the input. These sequence of events can lead to lag from when a user issues an input and the device responds accordingly, which can be pronounced when using touch interfaces. To connect content or application user interface to user events, such as responsive to finger movement on a touch screen, developers traditionally program an application to listen to touch input and, based on this input, move various graphical and textual elements. This approach requires application developers to author complex code specific to each scenario, device, operating system, and other platform-specific characteristics. In addition, this has performance limitations. Code listening to input which determines where to move objects can get interrupted or can introduce time delays to push updates to the screen causing objects to lag behind the user input.

OVERVIEW

Systems, methods, apparatuses, and software for touch input systems in computing environments are provided herein. In one example, an interaction service positioned logically between an operating system and an application is provided. The interaction service directs a processing system to receive a call from the application referencing an interaction class to attach to an object in a user interface used for the application, wherein the interaction class comprises a set of declarative statements. The interaction class attaches to the object in the user interface. A user input is then identified to the operating system associated with the object. In response to the user input, the interaction service determines which one of the declarative statements corresponds to the user input. The one of the declarative statements is then executed to call corresponding native code that performs an action with respect to the object.

In another examples, a method of operating a touch computing apparatus having an interaction service positioned logically between an operating system and an application is provided. The method includes, in the interaction service, receiving a call from the application referencing an interaction class to attach to an object in a user interface used for the application, wherein the interaction class comprises a set of declarative statements. The method further includes the interaction service attaching the interaction class to the object in the user interface, identifying a user input to the operating system associated with the object, determining which one of the declarative statements corresponds to the user input, and executing the one of the declarative statements to call corresponding native code that performs an action with respect to the object.

In another examples, an apparatus is provided. The apparatus includes one or more computer readable storage media, and program instructions stored on the one or more computer readable storage media. When executed by a processing system, the program instructions direct the processing system to at least receive a call from the application referencing an interaction class to attach to an object in a user interface used for the application, wherein the interaction class comprises a set of declarative statements. The program instructions further direct the processing system to at least attach the interaction class to the object in the user interface, identify a user input to the operating system associated with the object, determine which one of the declarative statements corresponds to the user input, and execute the one of the declarative statements to call corresponding native code that performs an action with respect to the object.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 5 illustrates a computing system suitable for implementing any of the architectures, processes, and operational scenarios disclosed herein.

DETAILED DESCRIPTION

Disclosed herein are application programming interfaces (APIs) that allow user input processing to be decoupled from an application, such as a user application. The user input APIs make it more efficient for developers to author how objects respond to user input, such as touch input, with support for various interaction regimes, such as rails, parallax, and scrolling while dragging shapes. In some examples, a declarative extensible markup language (XML) markup language can define how touch and other pointer inputs can manipulate object properties, such as position, rotation, size, scale, and opacity, based on math functions included in the markup language.

By providing a generalized way to describe how objects can be connected to the user input, this logic can be moved away from application-specific code and logically closer to the code that updates the screen which improves responsiveness. Technology is disclosed herein that decouples the code that listens for and responds to touch input from other threads in the core of an application. An application-independent platform is also disclosed to which multiple applications may off-load touch processing. The platform may be at a layer above the operating system or, in some implementations, may be integrated with the operating system.

Figure 1:
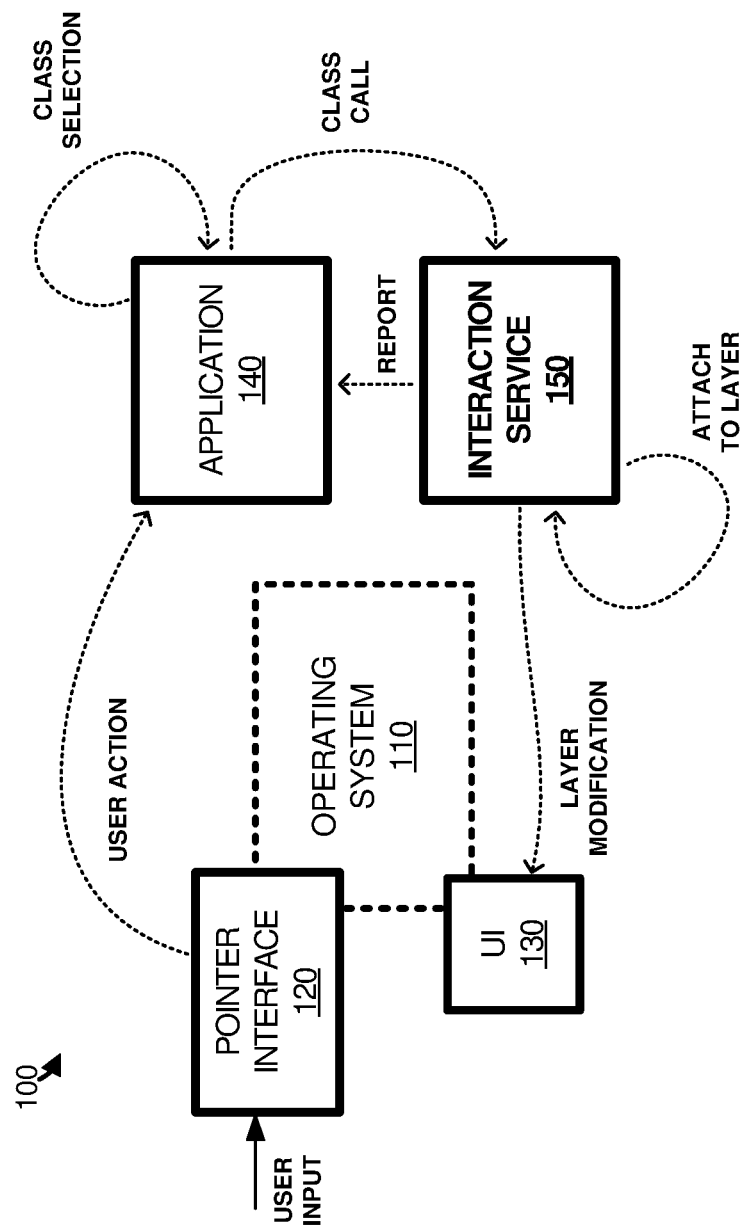
FIG. 1 illustrates a computing environment.

In a first example of touch processing in a computing environment, FIG. 1 is presented. FIG. 1 illustrates implementation 100 suitable for implementing any of the architectures, processes, and operational scenarios disclosed herein. Specifically, implementation 100 includes a software platform comprising operating system (OS) 110, pointer interface 120, user interface (UI) 130, application 140, and interaction service 150. Each of the elements of implementation 100 can be logically or communicatively coupled and executed on an associated computing system or processing system which can include elements as discussed below for FIGS. 3 and 5, although variations are possible.

In operation, when a user clicks on, touches, or otherwise selects a layer in a graphical user interface via pointer interface 120 for application 140, logic in application 140 determines the intent of the user. Application 140 then communicates an interaction class for the layer to interaction service 150. The interaction class indicates to interaction service 150 what actions to take with respect to images that comprise the layer.

Figure 2:
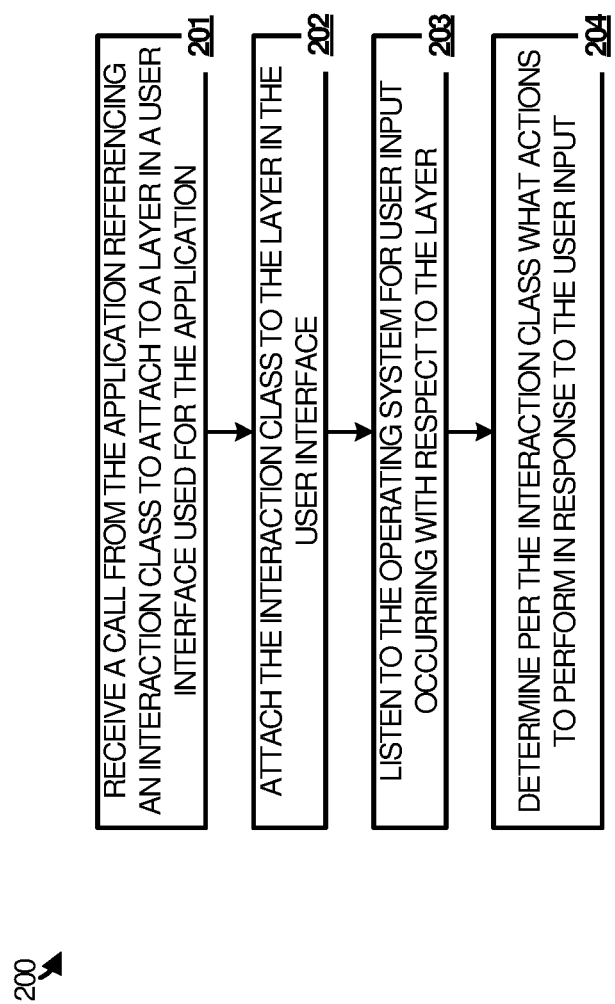
FIG. 2 illustrates a user input process in an implementation.

In a further operational example, FIG. 2 illustrates a user input process in an implementation. FIG. 2 illustrates user input process 200 that may be employed by a platform capable of handling the above mentioned user input processes. The platform may be implemented in software on a computing system, of which computing system 500 in FIG. 5 is representative.

In FIG. 2, interaction service 150 receives a call from application 140 referencing an interaction class to attach to a layer in a user interface used for application 140 (step 201). This call can indicate a pointer response desired for a particular user input that is particular to various layers or user interface elements of application 140. In many examples, the call is made using API calls which were previously defined using one or more declarative statements, such as XML or a scripting language. These declarative statements, which are compiled into one or more class calls or "structs" in application 140, allow for decoupling of the touch response from a particular software/hardware platform on which operating system 110 is implemented. The layer can indicate a graphical layer or subcomponent of a graphical user interface, such as for a user interface for application 140. Interaction service 150 attaches the interaction class to the layer in the user interface (step 202). This attachment process can include translating class calls in the call from application 140 into a platform-specific implementation that can alter the layer. For example, responsive to the call from application 140, interaction service 150 can identify platform-specific layer modification routines which are configured to modify the layer according to the class calls referencing the interaction class that are provided in the call from application 140.

Interaction service 150 listens to operating system 110 for user input occurring with respect to the layer (step 203). Interaction service 150 determines per the interaction class what actions to perform in response to the user input (step 204). The platform alters the layer accordingly and provides the output to a compositor, which may comprise issuing a report message back to application 140. The compositor, which may be in application 140 or may be an operating system component, integrates layer movement into a larger view of application 140.

Returning to the elements of FIG. 1, operating system 110 comprises one or more execution elements which provide an execution platform between user-facing applications and input devices and associated execution hardware. In many examples, operating system 110 comprises a multitasking or multithreaded operating environment for user applications, such as application 140, and also provides logical access to pointer interface 120 and various hardware elements, such as displays, user input devices, multimedia devices, and the like. Operating system 110 allows execution of application 140 on associated processing systems and memory devices.

Pointer interface 120 receives user pointer input from a mouse, keyboard, stylus, touch screen, touch panel, or other user input devices which can be used in combination with pointer input, such as voice input, visual input, or other user input methods. This user input can be detected by pointer interface 120 and translated into a user action which can be interpreted by further elements of implementation 100, such as operating system 110 or application 140.

User interface (UI) 130 comprises one or more graphical or textual user interface elements which are presented to a user of implementation 100 for interacting with the elements of application 140, among other applications. UI 130 can comprise many graphical layers or graphical elements which are superimposed and correlated to render an interactive windowed or tablet interface to a user, such as over one or more display screens. UI 130 can also include various audio output elements for indicating audible user interface elements to a user.

Application 140 comprises a user application, such as a productivity application, gaming application, or communication application, which is executed using OS 110 on a processing system. Application 140 presents one or more user interface elements, such as those rendered using UI 130, to allow a user to interface with application 140. For example, in a spreadsheet application, application 140 allows for an organized array of cells which are presented to a user in a graphical arrangement, along with any associated menus, tabs, status indicators, and user input elements. In example user interfaces, such as provided by at least pointer interface 120, application 140 can comprise a document or other such data structure (email, settings view, etc.) that may be opened and includes various layers or objects that can be manipulated. Examples include columns, borders, and pictures.

Interaction service 150 handles layer modification of graphical user interfaces presented by at least UI 130. The layer modification is typically performed responsive to user input received through pointer interface 120. Interaction service 150 resides outside of application 140 in this example and presents a control interface for applications of implementation 100 to modify user interface elements.

Figure 3:
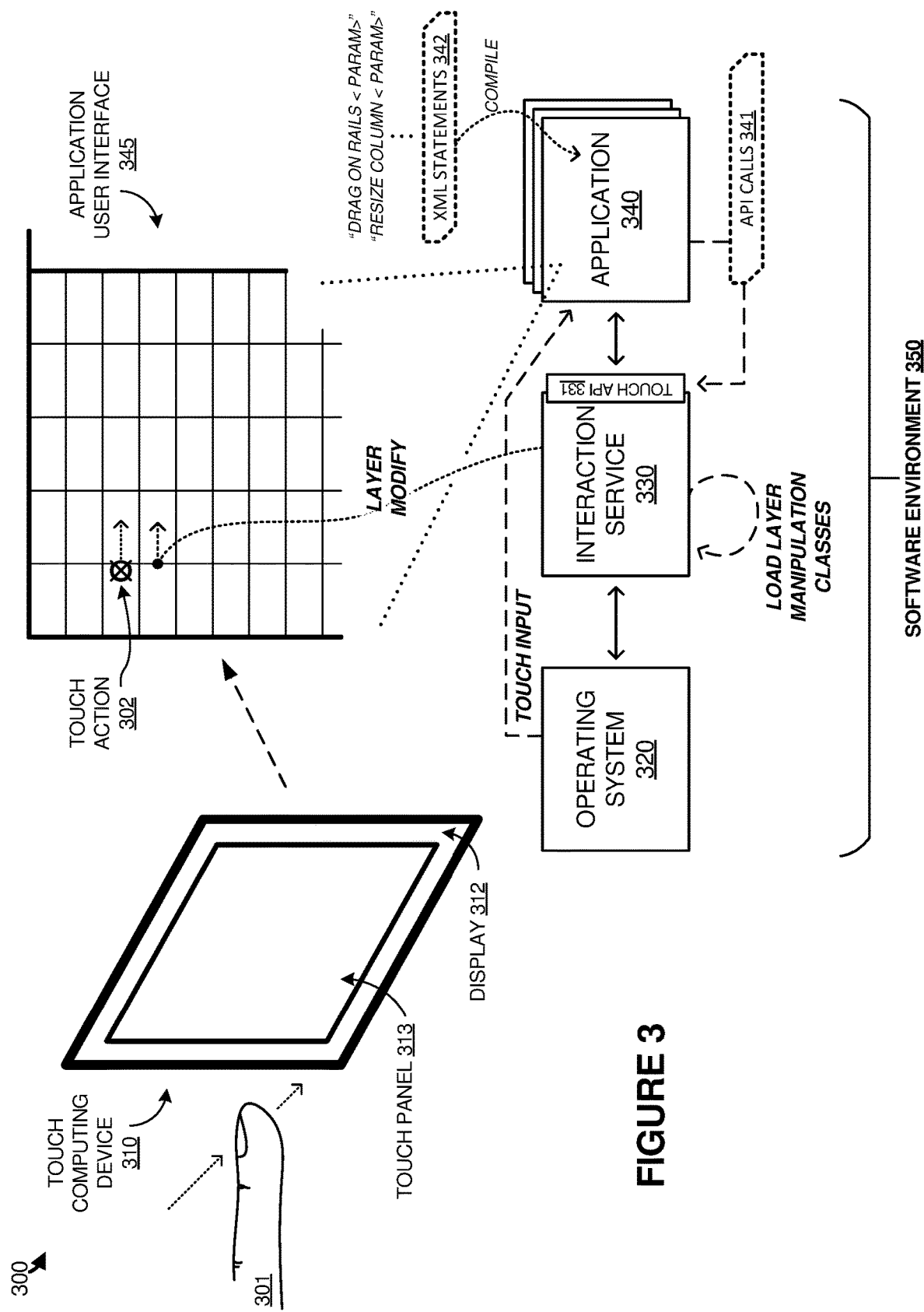
FIG. 3 illustrates a computing environment.

As a further example of a platform which provides enhanced user interactions to a user operating a touch device, FIG. 3 is presented. FIG. 3 is a system diagram illustrating computing system 300. Computing system 300 can be an example of the computing platform illustrated in FIG. 1, although variations are possible. System 300 includes touch computing device 310 which can comprise software environment 350. Software environment 350 comprises operating system 320, interaction service 330, and application 340. Application 340 presents application user interface 345 for a user to interact graphically with application 340 using a touch input instrument, such as finger 301 or a digitizer pen, stylus, pencil, among other instruments. Alternatively, any pointer input can be employed, such as a mouse or keyboard.

Touch computing device 310 includes a processing system, display panel with associated touch screen user interface, data storage systems, communication interfaces, and other associated computing and storage elements. Touch computing device 310 interacts with environment 350 for operating as discussed herein. In some examples, touch computing device 310 comprises software environment 350, while in other examples, a portion of software environment 350 is included in one or more distributed computing systems and only user interface elements reside in device 310.

In some examples, touch computing device 310 is representative of one or more end user computing devices, such as a smartphone, tablet computer, computer, laptop, server, gaming device, media capture device, personal digital assistant (PDA), e-book, mobile Internet appliance, media player, or other devices, including combinations thereof. Device 310 can communicate over one or more data links, which can include network interfaces, wireless interfaces, transceivers, network interface cards, or other links. Device 310 comprises network transceiver circuitry, processing circuitry, and user interface elements. The transceiver circuitry typically includes amplifiers, filters, modulators, and signal processing circuitry. Device 310 can also include user interface systems, network interface card equipment, memory devices, non-transitory computer-readable storage mediums, software, processing circuitry, or some other communication components.

In operation, one or more applications are presented to a user on display 312, which are executed within operating system 320. For example, application 340 can comprise a spreadsheet application with associated application user interface 345. Application user interface 345 includes a plurality of cells which can be used to arrange, manipulate, calculate, store, or otherwise manage a set of data or textual values which are displayed in a tabular format. A user can interact with application 340 using a touch interface that includes touch panel 313, among other user interface elements. Although FIG. 3 shows finger 301 contacting touch panel 313 of device 310, it should be understood that other touch inputs can be established, such as digitizer pens, styluses, digital pencils, pressure sensitive devices, among other components which can receive pressure input from a user, including combinations thereof.

This touch input might be to select various elements presented in application user interface 345, such as to select a particular cell or to enter data on a keyboard for that cell. This touch input might also be to navigate through various menus or procedural graphics elements that allow management of the data presented in application user interface 345. In FIG. 3, a specific example of touch action is shown with touch action 302. Touch action 302 comprises a column resizing for a column of cells in the spreadsheet indicated by application user interface 345. Other spreadsheet touch input scenarios include spreadsheet row/column dragging, row/column resizing, and selection dragging. In word processing applications, touch input scenarios include dragging paragraphs, dragging ghosted images, or moving columns or rows. Email or productivity applications include touch input scenarios such as dragging/dropping of mail items, resizing of contact pictures, or column resizing. In yet other applications, parallax adjustments can be made. Other touch input scenarios can be indicated by the touch input, which are not intended to be limited to the examples discussed herein.

In FIG. 3, interaction service 330 is provided to handle touch activity for application 340, among other applications. Application 340 can interface with interaction service 330 using one or more touch APIs, such as touch API 331. Application 340 can issue one or more calls that indicate layer modification instructions for touch handling response regarding touch input performed by users. Touch API 331 can allow for drag, drop, selection, and resize functionality over a standardized interface that allows for efficient response to touch input or other input sources. Touch API 331 provides a standardized interface for applications to handle touch input without each application having to be custom-coded to interact through touch API 331 to handle touch response for each individual operating system, hardware device, touch screen type, and other characteristics of the underlying hardware/software platform on which the application is executed.

An example operation of FIG. 3 is as follows using interaction service 330 and touch API 331. A "touch down" event occurs and sends touch input to the application, such as application 340. The touch down event corresponds to a finger or other touch implement contacting the touch surface of touch panel 313. Touch panel 313 can respond to the touch input with associated electrical signaling which is routed to and interpreted by a corresponding processor or processing system. Operating system 320 can provide hardware-software interfacing, such as via a driver or hardware abstraction layer features, which detects the touch event and provides an indication of the touch down event to the application, such as application 340.

The application hit tests the input and determines the input should trigger a manipulation, for example to drag a shape or object presented in the application. Furthermore, the application can optionally animate the shape, such as pop the shape out, to indicate the shape is receiving attention. The application can position the shape in a visual tree to achieve desired Z-Ordering, attach touch calls to the shape to indicate how the shape should connect to the finger, and start the touch interaction to alter the position, scaling, or other properties of the shape.

Before compiling, a developer or other end user can define response actions for the interaction declaratively, such as via XML statements 342. These XML statements are compiled into API calls 341 that affect touch API 331 which hands off the interaction to a higher performance display component, such as interaction service 330, and interaction service 330 listens to input on the behalf of the application to move the shape in response to the touch input. A display component of interaction service 330 moves the shape responsive to touch input according to the associated API calls 341. Interaction service 330 then responds back using callback messaging to the application to asynchronously share the position of the shape, or other properties that are altered for the shape or object.

Responsive to the callback messaging, the application can take various actions, including inaction responsive to the callback messaging if no action is required. The application can asynchronously update layout and animate other content out of the way of the shape. The application can asynchronously update variables that affect touch behavior in the application responsive to the touch alteration of the shape, such as moving in and out of rails, enabling alignment guides, or updating snap points, among others.

Furthermore, once a "touch up" input is detect, such as by lifting of finger 301 off of touch panel 313, various tasks can be performed by interaction service 330, such as the display component of interaction service 330 stopping movement of the shape, interaction service 330 providing notification of clients responsive to the shape alteration or touch input, where the clients responsively update layouts and animate the shape into the desired positions.

XML statements 342 used for defining API calls 341 for interfacing with touch API 331 can be defined in various ways to enable applications, such as application 340, to be decoupled from low-level hardware/OS-specific touch handling processes, and instead use a standardized API across various platforms. One example is detailed below, but it should be understood that this is merely exemplary and other markup definitions can be employed and other API interfaces can be employed.

Touch API 331 can establish a plurality of API calls that enable developers to define how touch, mouse, or pen inputs manipulate layer properties such as position, rotation, size, scale, opacity, or color, via mathematical statements that can be integrated into application 340 using declarative statements, such as XML statements 342. In one example, this markup includes Bindings and TouchClasses. Bindings specify how object properties (position, opacity, rotation, etc.) are connected to the finger or touch instrument. TouchClasses specify bindings used to manipulate a layer based on drag (pointer move events) and variables that modify these bindings.

Turning first to Bindings, touch XML bindings define how the properties of visual elements should be affected by different types of touch, mouse, or pen input. The touch XML markup language can include a field for Bindings name which indicates which Bindings type is to be employed for a touch response. Various child tags can be associated with the Bindings, with specific child tags for each of the Bindings type. These child tags specify properties associated with the Bindings type. For example, a first "property" child tag specifies a layer property to bind to a provided value, which can indicate an X or Y value to bind an X or Y position of a layer. Height and width values can also be specified in associated child tags, which bind the height or width of a layer to a provided value. Other child tags can be employed, such as further "property" child tags specifying scaling, opacity, or rotation about any of the X, Y, or Z axes. Furthermore, "value" child tags can be employed to specify pointer offsets, which can be employed to indicate an offset of the attachment relative to a current pointer position or in relation to a screen position.

A first example Bindings XML statement for a drag operation is as follows:

```
<bindings>
    <binding name="Basic_Drag">
        <propertyBinding property ="X" value ="{Variables::Left}"/>
        <propertyBinding property ="Y" value ="{Variables::Top}"/>
    </binding>
```

-continued

```
    <binding name="Basic_DragXRail">
        <propertyBinding property ="X" value ="{Variables::Left}"/>
    </binding>
</bindings>
```

TouchClasses define variables that modify Bindings and specify Bindings used to manipulate a layer in reaction to <onDrag> (PointerMoved events on that layer or associated with a specific pointerID). TouchClass attributes can specify a unique name of the TouchClass type. TouchClass child tags can be used to specify animations for airspace layer property events classes. A first TouchClass child tag comprises "onDrag" tags which contain child bindingReference tags that contain the name of the Binding used to define how properties are bound to touch input during onDrag (PointerMoved) events. A second TouchClass child tag comprises "variables" tags that can be used to modify bindings.

In a first example of TouchClass with associated child tags, a "drag freely" operation is shown below. This drag freely operation can be used, for example, in word processing live drag feedback and drag and drop lists, or scrolling a viewpoint on drag events. The drag freely operation allows a user to drag elements without constraint on directionality. The first example is as follows, which includes both Bindings statements and TouchClass statements:

```
<bindings>
    <binding name="Basic_Drag">
        <propertyBinding property ="X"
        value ="{Variables::Left}"/>
        <propertyBinding property ="Y"
        value ="{Variables::Top}"/>
    </binding>
</bindings>
<touchClasses>
    <!-- Move freely, bound to the finger -->
    <touchClass name="Shared_Drag">
    <variables>
        <constantVariable name="StartLeft" a="{Layer::Left}"/>
        <constantVariable name="StartTop" a="{Layer::Top}"/>
        <dynamicVariable name="Left" a="{Pointer::XOffset}"
        b="{Variables::StartLeft}" op="Add"/>
        <dynamicVariable name="Top" a="{Pointer::YOffset}"
        b="{Variables::StartTop}" op="Add"/>
    </variables>
        <onDrag>
            <bindingReference name="Basic_Drag"/>
        </onDrag>
    </touchClass>
</touchClasses>
```

In a second example of TouchClass with associated child tags, a "drag on rails" operation is shown below. This drag on rails operation can be used, for example, in word processing drag paragraph operations, scrolling a viewport on drag, or other drag operations that are partially constrained from deviation off a predetermined line of motion or rail. Call back messaging to the associated application can be provided with these operations, which allow the application to responsively move content out of the way of the dragged object or layer. The second example is as follows, which includes both Bindings statements and TouchClass statements:

```
<bindings>
    <binding name="Basic_DragXRail">
        <propertyBinding property ="X"
            value ="{Variables::Left}"/>
    </binding>
</bindings>
<touchClasses>
    <!-- Move on an X-Rail, bound to the finger -->
    <touchClass name="Shared_DragXRail">
        <variables>
            <constantVariable name="Start Left" a="{Layer::Left}"/>
            <dynamicVariable name="Left" a="{Pointer::XOffset}"
            b="{Variables::StartLeft}" op="Add"/>
        </variables>
            <onDrag>
                <bindingReference name="Basic_DragXRail"/>
            </onDrag>
    </touchClass>
</touchClasses>
```

TouchClass "variables" child tags help describe the touch interaction. They are processed in order, and a variable can refer to variables earlier in the list. Both dynamic and constant variables can be employed. Dynamic variables are calculated dynamically responsive to pointer movement. Constant variables are constant and calculated prior to any pointer movement.

Further parameters can be included with the "variables" values, and in some examples, are in the form (A, B, operator). Parameters 'A' and 'B' can be a constant value, a layer identification value, a contextual value, a pointer value, or a further variable. Layer values can comprise a series of strings or values that indicate a layer identifier or layer property (left, top, right, bottom, width, height). Layer values can be queried via layer state. Context values can comprise arbitrarily named variables set by the application for each layer. Pointer values can be based on where the pointer is on-screen. Pointer values can comprise an offset from where the input was originally located on screen. Pointer values can comprise an absolute location on screen. Further variables can comprise variables previously defined in the class, among others. The Operator parameter can specify how to compare the A, B values, which can comprise mathematical statements, such as addition, subtraction, multiplication, division, distances, curves, or other mathematical statements.

As a first example of a TouchClass with "variables," the following is presented:

```
<!-- Move on a rail, at half the distance of the pointer offset -->
<touchClass name="Example_ParallaxOnXRail">
    <variables>
        <dynamicVariable name="XVar" a="{Pointer::XOffset}"
        b="0.5" op="Mult"/>
    </variables>
    <onDrag>
        <bindingReference name="Basic_ModifiedDragX"/>
    </onDrag>
</touchClass>
```

Additionally, conditionals, such as if-else statements, can be employed which enables an application to change Bindings, such as touch/input behaviors, based on conditions specified in the TouchClass. For example, if-else statements can be placed inside the onDrag tags of a TouchClass. When the onDrag event is triggered, if-else statements specify the Binding that is applied based on conditions. The first condition that evaluates to true in an if-else statement specifies the Binding to apply. If no conditions evaluate to true then no Binding is applied. Conditionals are evaluated as the input is updated, such as due to pointer movement, which can change the touch behavior during the interaction.

Further parameters can be included with the "if-else statement" values. If-else statements can be single or chained to form more complex if-else arrangements. In some examples, if-else statements are in the form (A, B, operator). Parameters 'A' and 'B' can be a constant value, a layer identification value, a contextual value, a pointer value, or a further variable. Layer values can comprise a series of strings or values that indicate a layer identifier or layer property (left, top, right, bottom, width, height). Layer values can be queried via layer state. Context values can comprise arbitrarily named variables set by the application for each layer. Pointer values can be based on where the pointer is on-screen. Pointer values can comprise an offset from where the input was originally located on screen. Pointer values can comprise an absolute location on screen. Further variables can comprise variables previously defined in the class, among others. The Operator parameter can specify how to compare the A, B values, which can comprise mathematical statements or comparison statements, such as equality statements, or other comparison statements such as greater-than, less-than, greater-than-or-equal, or less-than-or-equal, among others. One example if-else statement is as follows:

```
<if a="{Pointer::XOffset}" b="{Context::Left-
    Bound}" op="GTE">
```

A further if-else example is as follows, which can be a center layer drag onrails with bounds. This further example might be used for spreadsheet column header move on resize operations:

```
<bindings>
    <binding name="Basic_ModifiedDragX">
        <propertyBinding X="{Variables::XVar}"/>
    </binding>
</bindings>
<!-- Move on a rail, at half the distance of the pointer offset -->
<touchClass name="Example_ParallaxOnXRail">
    <variables>
        <dynamicVariable name="XVar" a="{Pointer::XOffset}"
        b="0.5" op="Mult"/>
        <constantVariable name="InitialLayerLeft"
        a="{Layer::Left}" />
        <dynamicVariable name="LayerDragPosition"
        a="{Pointer::XOffset}"
        b="{Layer::InitialLayerLeft}" op="Add" />
    </variables>
    <onDrag>
        <if a="{LayerDragPosition}" b="{Context::LeftBound}"
        op="GTE">
            <bindingReference name="Basic_ModifiedDragX"/>
        </if>
    </onDrag>
</touchClass>
```

In another example operation, a scroll-on-drag operation is described. In this example, scrollable areas can support various properties that enable automatic scrolling when an object is dragged near the edge of an associated scrolling viewport. Various parameters in XML tags for scroll on drag operations can be defined, such as enable flags, distance values, min/max velocity values, among others. The enable flag comprises a value that indicates whether the viewport automatically scrolls when an object is dragged near its edge. The distance value comprises a distance from the pointer to the edge of the viewport (in pixels) at which scrolling starts. Default distance values, such as 200 pixels, can be established for the distance value, although other default values can be specified. A minimum scroll velocity can be defined which comprises a starting viewport velocity when the pointer is within the distance value, specified above, from the edge of the viewport. This velocity can be established to increase linearly towards the maximum scroll velocity as the pointer approaches the edge of the viewport. The maximum scroll velocity occurs when the pointer hits the edge or moves beyond the edge of the scroll. In some examples, the minimum scroll velocity can be defaulted to 150.0 pixels/sec., while the maximum scroll velocity can be defaulted to 4000.0 pixels/sec., although other default values can be specified.

Scrolling can be handled in various ways, such as by the operational example as follows. The viewport can start to move in the same direction as the dragged object at the specified minimum velocity when the pointer dragging an object is the specified distance from the edge of the viewport and the drag is moving at an angle, such as 45°, towards the edge of the viewport. The speed of the viewport increases linearly from the minimum velocity towards the maximum velocity as the pointer is dragged closer to the edge of the viewport. If the user stops dragging at the angle, such as 45°, towards the edge of the viewport, scrolling will stop. The speed of the viewport is the maximum velocity when the pointer reaches the edge or is moved beyond the viewport.

Further operational scenarios can be established using the above example XML parameters. A first scenario includes dragging an object within a scrolling area. When an object is dragged to the edge of a viewport the viewport will scroll until the viewport hits the end of the scrollable content, the user stops dragging the object, or the user drags the object away from the edge of the viewport. When a dragged object is dragged to the edge of the viewport and a user continues to move the finger away, the object will stay pinned to the edge of the viewport and the viewport will continue to scroll.

A second scenario includes dragging an object within/across "scroll viewers." When an object is dragged to the edge of a viewport the viewport will scroll until the viewport hits the end of the scrollable content, the user stops dragging the object, or the user drags the object away from the edge of the viewport. When a dragged object is dragged to the edge of the viewport and a user continues to move the finger away a distance, the object will snap out of the scroll viewer to the touch point (e.g. finger) of the user. When the user moves the object back into a scroll viewer the object will have the above behavior if the scroll viewer supports scrolling on drag.

A third scenario includes dragging an object within or across scrollable quadrants. When an object is dragged to the edge of a scrollable quadrant the quadrant will scroll until the quadrant hits the end of the scrollable content, the user stops dragging the object, or the user drags the object away from the edge of the viewport. When a dragged object is dragged to the edge of the quadrant and a user continues to move the finger away the object will remain stuck on the edge of the scrollable quadrant while there is content to scroll. When there is no longer content to scroll the object will snap out of the scrollable quadrant.

Advantageously, XML statements 342 defined using the declarative XML markup language and integrated into application 340 allow standardized interaction through touch API 331 which provides enhanced operations for touch computing devices. These enhanced operations can allow applications to more efficiently define how objects connect to touch input, such as finger input. This provides various technical effects and advantages by increasing the response time of touch input and reducing processor load and associated code execution for applications. XML statements 342 establish how touch, mouse, pen, or other user inputs manipulate layer properties using mathematical statements. These layer properties can include position, rotation, size, scale, opacity, color, or other properties. XML Binding parameters can define how object properties should be affected by different types of touch, mouse, or pen input. XML Variable parameters assist the Bindings to describe the touch interaction. XML conditionals can define how touch interactions change based on different conditions. Scroll operations can also be tied to touch via the ability to define and control how content scrolls when objects are dragged across the content.

Figure 4:
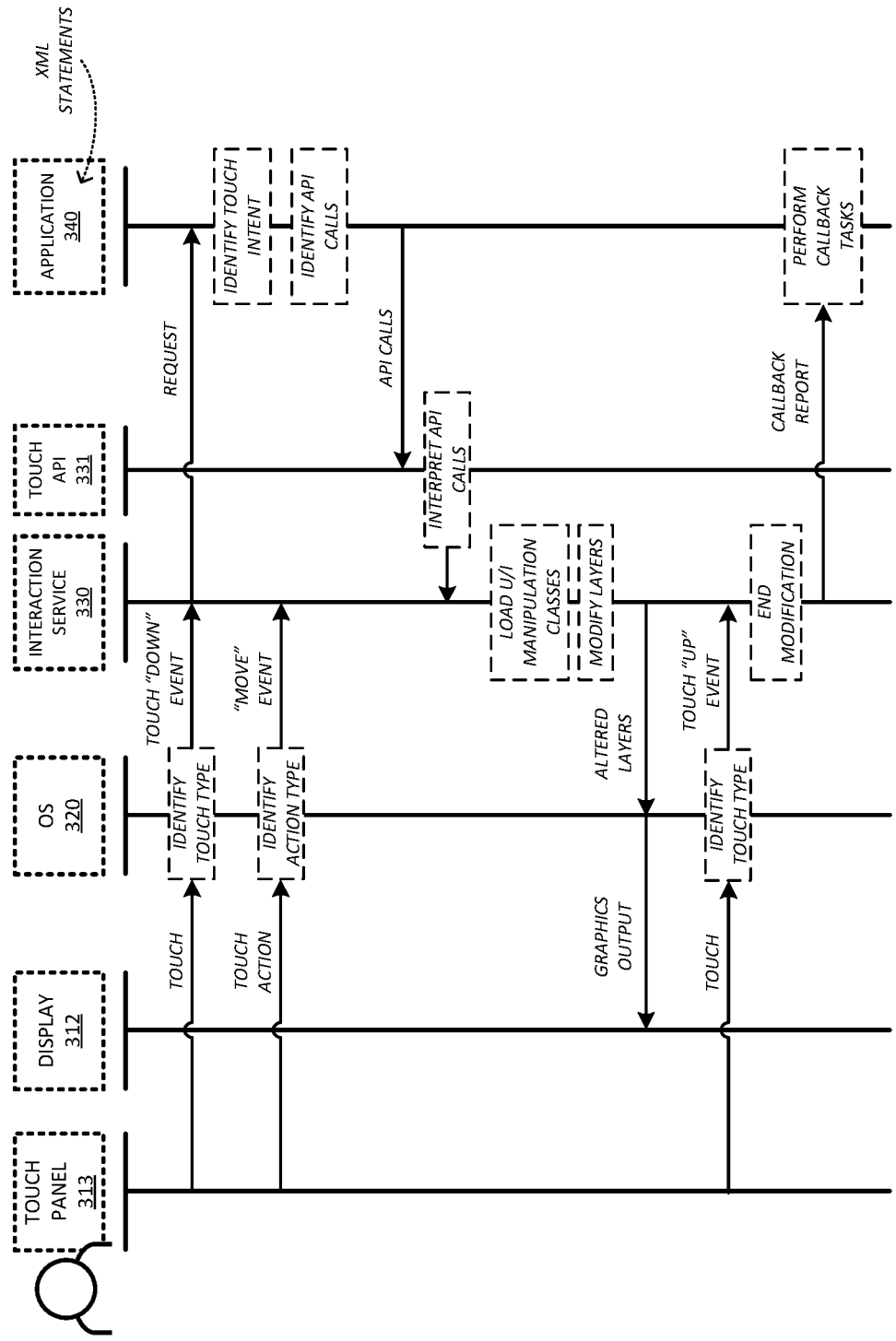
FIG. 4 illustrates a touch process in an implementation.

Turning now to a further example operation of the elements of FIG. 3, FIG. 4 is presented. FIG. 4 is a sequence diagram illustrating an example operation of the environment 300. The operations of FIG. 4 can instead be employed on any of the hardware/software elements discussed herein, such as environment 100 in FIG. 1 or computing system 501 in FIG. 5.

In FIG. 4, a touch occurs via touch panel 313, which OS 320 identifies as a touch down event, indicating a finger or other instrument has made initial contact with touch panel 313 to initiate a touch action. An indication of the touch down event is delivered to interaction service 330 which can responsively request API calls 341 from application 340 as layer modification instructions to handle touch actions with respect to application 340. Alternatively, application 340 can receive the indication of the touch down event and responsively identify API calls 341. In this example, the one or more API calls can be those initially defined by XML statements 342 in FIG. 3.

To identify API calls 341, or other calls, application 340 first can identify an intent of the touch down event. This touch intent can indicate what actions might follow from the touch down event, and application 340 can indicate appropriate ones of the API calls to interaction service 330 through touch API 331. In a degenerate case, all API calls might be indicated to interaction service 330, but this might lead to poor performance, confusion during interpretation, or slowdowns to interpret a large number of statements. Instead, only a subset of the possible API calls for handling touch input with application 340 are indicated to interaction service 330. This subset is determined based on the touch intent as determined by application 330. API calls are selected by application 340 from a set of the initially defined and compiled XML statements according to touch intent determined from at least a touch down event with respect to the layer. For example, if the touch down event occurs on or near a column of a spreadsheet, then the touch intent can be determined to be a column drag or column resize, which also might occur as a drag or resize "on rails" to maintain a linear directionality of any subsequent touch movement. In another example, if the touch down event occurs on a picture or image in a word processor, then the touch intent can be determined to be an image drag, or image scale if touched near a corner of the image. In further examples, such as multi-point touch panels, more than one touch event can occur simultaneously and associated touch intent can be determined. Other touch intent determinations can be made based at least on the location of the touch down event in relation to various user interface layers or objects.

Once the touch intent is determined, then appropriate API calls can be indicated to interaction service 330 via touch API 331. It should be noted that in some examples, application 340 does not determine the touch intent, and instead interaction service 330 or OS 320 determines the touch intent and transfers an indication of the touch intent to application 340. The API calls from application 340 to interaction service 330 comprise one or more of API calls 341, which can define layer modification instructions for response to touch actions of the user, such as those described above. The API calls can describe reactions, alterations, or modifications to graphical elements, such as layers, objects, and the like, responsive to various touch movement as monitored by OS 320 or interaction service 330. The API calls relate to interaction classes handled by interaction service 330. The API calls can reference these interaction classes through the standardized or modularized interface provided by touch API 331 that abstract the platform-specific elements from application 340.

Interaction service 330 can receive API calls 341 in FIG. 3, and interpret the API calls to identify and load various layer manipulation classes. Touch API 331 presents a standardized API to any number of applications, of which application 340 can be a member. Instead of having custom layer manipulation algorithms hard coded into each application, touch API 331 and interaction service 330 provide for decoupling of layer manipulations from the instructions issued by an application. Specifically, the present example uses XML declarative statements to initially define responses to pointer input, and these XML declarative statements are compiled into application 340 and are standardized among various applications. These XML declarative statements can be interpreted at compile time of application 340 into API calls 341 for interfacing with touch API 331 or interaction service 330 once translated into associated layer manipulation classes.

The layer manipulation classes can be described in platform-specific code, linked libraries, dynamic linked libraries (DLLs), executables, or other logical objects. For example, interaction service 330 can reference interaction classes specially coded for a platform on which application 340 is executed, whether that platform is unique in terms of hardware, software, operating system, drivers, virtualization environment, distributed processing environment, or other terms, including variations and combinations thereof. Interaction service 330 can interpret API calls 341 to load the customized or specialized interactions classes that are unique to the particular platform on which application resides.

Once appropriate interaction classes have been loaded by interaction service 330, according to API calls 341 indicated by application 340, then interaction service 330 modifies one or more layers according to touch input. Specifically, a set of API calls 341 might be indicated to interaction service 330 for handing touch input based in part on the touch intent. Further touch action then can occur, such as movement of a finger or stylus across touch panel 313. This touch movement can be identified by OS 320 and a move event can be indicated to interaction service 330. Various graphical or user interface layers can be modified using the interaction classes called or loaded by interaction service 330, in conjunction with any variables, parameters, math, or other information provided in XML statements 342 integrated into application 340. In this manner, application 340 can establish interactive touch responses to touch actions using standardized XML statements which are compiled into API calls 341 and subsequently interpreted by interaction service 330 as referencing interaction classes that are subsequently loaded with any variables, parameters, math, or other information provided in XML statements 342 associated with application 340.

Layer modifications can include any of the modifications discussed herein, such as movement of graphical elements, resizing of graphical elements, as well as scaling, opacity, rotation, selection, or other modifications. The modifications can be performed during touch activity, such as during movement of a finger over touch panel 313. The modifications can be affected by behavioral instructions indicated by the XML statements, such as movement velocities, scroll behavior, viewport window behaviors, among others. Altered layers can be presented to OS 320 which responsively generates graphics output for delivery to graphics hardware and display 312.

Once a touch "up" event is detected, then modification of the layer or layers can be ended. Other ending events can be detected, such as logical events related to movement of the objects or layers themselves, i.e. scroll limitations, viewport restrictions, and the like. In further examples, such as multi-point touch panels, more than one touch event can occur simultaneously and associated touch intent or movement can be determined and monitored to alter the layers or to cease altering layers.

Responsive to ending of layer modifications, or during modifications, interaction service 330 can optionally transfer one or more callback indications to application 340. Application 340 can responsively perform one or more callback tasks. These callback tasks can further alter layer information after touch movement has ceased, such as to modify contextual layer information which was affected by the layer modifications initiated by the touch input mentioned above. The callback indication can prompt application 340 to perform contextual application user interface changes based at least on the modifications to the layer made by interaction service 330. For example, if a picture is dragged by a touch activity, then application 340 might rearrange text that surrounds the picture to align the text with a new picture position or scaling. In spreadsheet examples, a column resize modification might prompt application 340 to scale other columns accordingly, or to resize text within the resized column, among other contextual operations. These callback tasks can alter layers which application 340 can indicate to OS 320 for display to a user, as done with the layer alteration of interaction service 330.

FIG. 5 illustrates computing system 501 that is representative of any system or collection of systems in which the various operational architectures, scenarios, and processes disclosed herein may be implemented. Examples of computing system 501 include, but are not limited to, smart phones, laptop computers, tablet computers, desktop computers, hybrid computers, gaming machines, virtual machines, smart televisions, smart watches and other wearable devices, as well as any variation or combination thereof. Other examples include server computers, rack servers, web servers, cloud computing platforms, and data center equipment, as well as any other type of physical or virtual server machine, and any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, user interface system 508, and pointer interface system 509. Processing system 502 is operatively coupled with storage system 503, communication interface system 507, user interface system 508, and pointer interface system 509.

Processing system 502 loads and executes software 505 from storage system 503. Software 505 includes pointer environment 506, which is representative of the touch processes discussed with respect to the preceding Figures.

When executed by processing system 502 to enhance user input processing and handling for applications, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and processing circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced touch input processing and handling for applications.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include pointer environment 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced touch input processing and handling for applications. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Pointer environment 506 includes one or more software elements, such as OS 521, user application 522, and interaction service 523. These elements can describe various portions of computing system 501 with which a user interacts. For example, OS 521 can provide a software platform on which user application is executed and allows for receipt and monitoring of user input from pointer interface system 509. User application 522 can be any application discussed herein, such as productivity, gaming, or multimedia applications, and includes user interface elements which can be manipulated by a user, such as with touch input. Interaction service 523 presents a standardized API to user application 522 which application 522 can employ to instruct interaction service 523 on how to handle touch input with respect to user interface elements of application 522. Interaction service 523 can translate received API calls into platform-specific classes or processes which can be responsively employed to modify layers according to the user input and informed by parameters in declarative statements compiled into an application. These layer modifications can be provided to OS 521 for output as graphical display information on a video screen, display panel, network interface, or other output interface.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 508 is optional and may include a keyboard, a mouse, a voice input device, a touch input device as discussed for pointer interface system 509 for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 508. In some cases, the input and output devices may be combined in a single device, such as a display capable of displaying images and receiving touch gestures. The aforementioned user input and output devices are well known in the art and need not be discussed at length here. User interface system 508 can instead provide output and receive input over a network interface, such as communication interface system 507. In network examples, user interface system 508 might packetize display or graphics data for remote display by a display system or computing system coupled over one or more network interfaces.

User interface system 508 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Pointer interface system 509 comprises one or more pointer input devices for receiving user input, such as mouse input, keyboard input, touch gestures, pressure gestures, or other input from a user. In some examples, pointer interface system 509 comprises a capacitive multi-touch touch panel which is coupled to a display screen. In other examples, resistive or pressure sensitive elements are employed to sense touch input or pressure input from a user or implement. Various circuitry can be employed to sense the input, translate the input from an analog signal to digital signaling, and transfer the digital signals to elements of processing system 502. Amplifiers, filters, or other signal processing circuitry can be employed to modify the signals generated by touch or pressure input.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JAVASCRIPT, JSON (JAVASCRIPT Object Notation), and AJAX (Asynchronous JAVASCRIPT and XML), as well as any other suitable protocol, variation, or combination thereof.

Various improvements to touch input handling technology may be appreciated from the foregoing implementations. The ability of an interaction service to abstract or decouple touch input response for an application from platform-specific layer manipulation classes or processes can provide for enhanced operation of the application. The applications can become more portable over many different platforms by utilizing standardized APIs for layer manipulation provided by the interaction service. The interaction service can also reduce processing time and memory usage by receiving from an application only a specific collection of API calls selected based on touch intent, where the API calls indicate a subset of layer manipulation classes to be loaded for handling touch input. Such technical effects improve the functioning of applications and operating systems, and enhance operations and responsiveness in user input handling, such as for touch computing devices.

Certain inventive aspects may be appreciated from the foregoing disclosure, of which the following are various examples.

Example 1

A computing apparatus comprising one or more computer readable storage media, a processing system operatively coupled with the one or more computer readable storage media, and program instructions stored on the one or more computer readable storage media comprising an interaction service positioned logically between an operating system and an application. The interaction service, when executed by the processing system, directs the processing system to at least receive a call from the application referencing an interaction class to attach to a layer in a user interface used for the application, attach the interaction class to the layer in the user interface, listen to the operating system for user input occurring with respect to the layer, and determine per the interaction class what actions to perform in response to the user input.

Example 2

The apparatus of Example 1, comprising further program instructions, when executed by the processing system, direct the processing system to at least receive at least one application programming interface (API) call from the application corresponding to layer modification instructions indicating at least a set of parameters for handling the response to the user input.

Example 3

The apparatus of Examples 1-2, where the at least one API call is selected by the application among a set of API calls according to touch intent determined from at least a touch down event with respect to the layer.

Example 4

The apparatus of Examples 1-3, comprising further program instructions, when executed by the processing system, direct the processing system to at least determine the touch intent based on at least on a relationship of the touch down event with respect to the layer, and provide an indication of the touch intent to the application.

Example 5

The apparatus of Examples 1-4, where the at least one API call is determined from at least one extensible markup language (XML) statement compiled into the application, the at least one XML statement indicating the layer modification instructions and the set of parameters for handling the response to the user input.

Example 6

The apparatus of Examples 1-5, comprising further program instructions, when executed by the processing system, direct the processing system to at least receive at least one API call from the application that indicates layer modification instructions from among a set of layer modification instructions standardized for a plurality of applications, wherein the at least one API call further comprises parameters for the response to the user input.

Example 7

The apparatus of Examples 1-6, comprising further program instructions, when executed by the processing system, direct the processing system to at least, responsive to the call from the application, identify platform-specific layer modification routines which are configured to modify the layer according to the at least one API call referencing the interaction class that is provided in the call from the application.

Example 8

The apparatus of Examples 1-7, comprising further program instructions, when executed by the processing system, direct the processing system to at least, in response to determining per the interaction class what actions to perform, modify the layer using the interaction class according to at least the user input and API calls received from the application that indicate a desired reaction to the user input.

Example 9

The apparatus of Examples 1-8, comprising further program instructions, when executed by the processing system, direct the processing system to at least transfer a callback indication to the application responsive to modifications to the layer in response to the user input, where the callback indication prompts the application to perform contextual application user interface changes based at least on the modifications to the layer.

Example 10

A method of operating a touch computing apparatus having an interaction service positioned logically between an operating system and an application, the method comprising, in the interaction service, receiving a call from the application referencing an interaction class to attach to a layer in a user interface used for the application, attaching the interaction class to the layer in the user interface, listening to the operating system for touch input occurring with respect to the layer, and determining per the interaction class what actions to perform in response to the touch input.

Example 11

The method of Example 10, further comprising, in the interaction service, receiving at least one application programming interface (API) call from the application corresponding to layer modification instructions indicating at least a set of parameters for handling the response to the touch input.

Example 12

The apparatus of Examples 10-11, wherein the at least one API call is selected by the application among a set of API calls according to touch intent determined from at least a touch down event with respect to the layer.

Example 13

The apparatus of Examples 10-12, further comprising, in the interaction service, determining the touch intent based on at least on a relationship of the touch down event with respect to the layer, and providing an indication of the touch intent to the application.

Example 14

The apparatus of Examples 10-13, where the at least one API call is determined from at least one extensible markup language (XML) statement compiled into the application, the at least one XML statement indicating the layer modification instructions and the set of parameters for handling the response to the user input.

Example 15

The apparatus of Examples 10-14, further comprising, in the interaction service, receiving at least one API call from the application that indicates layer modification instructions from among a set of layer modification instructions standardized for a plurality of applications, wherein the at least one API call further comprises parameters for the response to the touch input.

Example 16

The apparatus of Examples 10-15, further comprising, in the interaction service, responsive to the call from the application, identifying platform-specific layer modification routines which are configured to modify the layer according to the at least one API call referencing the interaction class that is provided in the call from the application.

Example 17

The apparatus of Examples 10-16, further comprising, in the interaction service, in response to determining per the interaction class what actions to perform, modifying the layer using the interaction class according to at least the touch input and API calls received from the application that indicate a desired reaction to the touch input.

Example 18

The apparatus of Examples 10-17, further comprising, in the interaction service, transferring a callback indication to the application responsive to modifications to the layer in response to the touch input, where the callback indication prompts the application to perform contextual application user interface changes based at least on the modifications to the layer.

Example 19, an apparatus comprising one or more computer readable storage media, program instructions stored on the one or more computer readable storage media. When executed by a processing system, the processing instructions direct the processing system to at least receive a call into an interaction class from an application, load the interaction class, attach the interaction class to a layer, listen for pointer input with respect to the layer, and determine per the interaction class what actions to perform in response to the pointer input.

Example 20

The apparatus of Example 19, comprising further program instructions, when executed by the processing system, direct the processing system to at least receive at least one API call from the application that indicates layer modification instructions and parameters for handling the response to the touch, identify platform-specific layer modification routines which are configured to modify the layer according to the interaction class identified in the at least one API call, and in response to determining per the interaction class what actions to perform, modify the layer using the interaction class according to at least the parameters indicated in the at least one API call.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
   one or more computer readable storage media;
   a processing system operatively coupled with the one or more computer readable storage media; and
   program instructions stored on the one or more computer readable storage media comprising an interaction service positioned logically between an operating system and an application, wherein the interaction service, when executed by the processing system, directs the processing system to at least:
   at a beginning of a touch interaction associated with an object in a user interface to the application, request interaction calls from the application for handling at least a subsequent portion of the touch interaction, wherein the interaction calls include information that defines responses to touch interactions with the object;
   receive, from the application, the interaction calls through an application programming interface to the interaction service;
   identify interaction classes to attach to the object based on the information in the interaction calls;
   attach the interaction classes to the object in the user interface of the application;
   in response to the subsequent portion of the touch interaction, call one or more of the interaction classes to affect one or more responses by the object; and
   at an end of the touch interaction, call back to the application with an updated state of the object that reflects the one or more responses by the object.

2. The computing apparatus of claim 1, wherein the object comprises at least one of a column, a row, a border, a shape, an image, or a file item.

3. The computing apparatus of claim 1, wherein the one or more responses by the object comprises at least one of a rotation, a scale, a drag, a drop, a selection, an opacity, a scroll, and a resize on rails to maintain a linear directionality of a subsequent touch interaction.

4. The computing apparatus of claim 1, wherein the one or more of the interaction classes are executed by the application to call corresponding native code according to a touch intent determined from at least a touch down event with respect to the object.

5. The computing apparatus of claim 4, wherein the program instructions, when executed by the processing system, further direct the processing system to at least:
   determine the touch intent based on at least on a relationship of the touch down event with respect to the object and provide an indication of the touch intent to the application.

6. The computing apparatus of claim 1, wherein the program instructions, when executed by the processing system, further direct the processing system to at least:
   execute the one or more of the interaction classes to call corresponding native code that is configured to affect the one or more responses by the object; and
   in response to executing the one or more of the interaction classes to call the corresponding native code, modify the object according to at least the subsequent portion of the touch interaction and the corresponding native code.

7. The computing apparatus of claim 6, wherein the program instructions, when executed by the processing system, further direct the processing system to at least:
   responsive to the call to the corresponding native code that is configured to affect the one or more responses by the object, identify platform-specific object modification routines which are configured to modify the object according to the native code called by the one or more of the interaction classes.

8. The computing apparatus of claim 1, wherein the program instructions, when executed by the processing system, further direct the processing system to at least:

transfer a callback indication to the application responsive to modifications to the object in response to the subsequent portion of the touch interaction, wherein the callback indication prompts the application to perform contextual application user interface changes based at least on the modifications to the object.

9. The computing apparatus of claim 1, wherein the program instructions, when executed by the processing system, further direct the processing system to at least:
determine at least one Application Programming Interface call from at least one Extensible Markup Language (XML) statement compiled into the application, the at least one XML statement indicating layer modification instructions and a set of parameters of the one or more interaction classes for handling the at least a subsequent portion of the touch interaction.

10. A method of operating a touch computing apparatus having an interaction service positioned logically between an operating system and an application, the method comprising:
in the interaction service, at a beginning of a touch interaction associated with an object in a user interface to the application, requesting interaction calls from the application for handling at least a subsequent portion of the touch interaction, wherein the interaction calls include information that defines responses to touch interactions with the object;
in the interaction service, receiving, from the application the interaction calls through an application programming interface to the interaction service;
identifying interaction classes to attach to the object based on the information in the interaction calls;
in the interaction service, attaching the interaction classes to the object in the user interface of the application;
in the interaction service, in response to the subsequent portion of the touch interaction, calling one or more of the interaction classes to affect one or more responses by the object; and
in the interaction service, at an end of the touch interaction, calling back to the application with an updated state of the object that reflects that one or more responses by the object.

11. The method of claim 10, wherein the object comprises at least one of a column, a row, a border, a shape, an image, or a file item.

12. The method of claim 10, wherein the one or more responses by the object comprises at least one of a rotation, a scale, a drag, a drop, a selection, an opacity, a scroll, and a resize on rails to maintain a linear directionality of a subsequent touch interaction.

13. The method of claim 10, wherein the one or more of the interaction classes are executed by the application to call corresponding native code according to a touch intent determined from at least a touch down event with respect to the object.

14. The method of claim 13, further comprising:
determining the touch intent based on at least on a relationship of the touch down event with respect to the object and provide an indication of the touch intent to the application.

15. The method of claim 10, further comprising:
executing the one or more of the interaction classes to call corresponding native code that is configured to affect the one or more responses by the object; and
in response to executing the one or more of the interaction classes to call the corresponding native code, modifying the object according to at least the subsequent portion of the touch interaction and the corresponding native code.

16. The method of claim 15, further comprising:
responsive to the call to the corresponding native code that is configured to affect the one or more responses by the object, identifying platform-specific object modification routines which are configured to modify the object according to the native code called by the one or more of the interaction classes.

17. The method of claim 10, further comprising:
transferring a callback indication to the application responsive to modifications to the object in response to the subsequent portion of the touch interaction, wherein the callback indication prompts the application to perform contextual application user interface changes based at least on the modifications to the object.

18. The method of claim 10, further comprising:
determining at least one Application Programming Interface call from at least one Extensible Markup Language (XML) statement compiled into the application, the at least one XML statement indicating layer modification instructions and a set of parameters for handling the at least a subsequent portion of the touch interaction.

19. An apparatus comprising:
one or more computer readable storage media;
program instructions stored on the one or more computer readable storage media that, when executed by a processing system, direct the processing system to at least:
at a beginning of a touch interaction associated with an object in a user interface to an application, request interaction calls from the application for handling at least a subsequent portion of the touch interaction, wherein the interaction calls include information that defines responses to touch interactions with the object;
receive, from the application, the interaction calls through an application programming interface to an interaction service;
identify interaction classes to attach to the object based on the information in the interaction calls;
attach the interaction classes to the object in the user interface of the application;
in response to the subsequent portion of the touch interaction, call one or more of the interaction classes to affect one or more responses by the object; and
at an end of the touch interaction, call back to the application with an updated state of the object that reflects the one or more responses by the object.

20. The apparatus of claim 19, wherein the object comprises at least one of a column, a row, a border, a shape, an image, or a file item, and wherein one or more responses by the object comprises at least one of a rotation, a scale, a drag, a drop, a selection, an opacity, a scroll, and a resize on rails to maintain a linear directionality of a subsequent touch interaction.

* * * * *